US012086914B2

(12) United States Patent
Ruiz et al.

(10) Patent No.: US 12,086,914 B2
(45) Date of Patent: Sep. 10, 2024

(54) GRAPHICAL USER INTERFACE FOR PRESENTING GEOGRAPHIC BOUNDARY ESTIMATION

(71) Applicant: Ancestry.com DNA, LLC, Lehi, UT (US)

(72) Inventors: Luong Ruiz, San Bruno, CA (US); Samuel Henry Dauphinee, Spanish Fork, UT (US); Paul Rawlins, South Salt Lake, UT (US); Oleksii Mukhin, Lviv (UA); Jeremy Allen Casper, American Fork, UT (US)

(73) Assignee: Ancestry.com DNA, LLC, Lehi, UT (US)

( * ) Notice: Subject to any disclaimer, the term of this patent is extended or adjusted under 35 U.S.C. 154(b) by 111 days.

(21) Appl. No.: 17/993,387

(22) Filed: Nov. 23, 2022

(65) Prior Publication Data

US 2023/0162417 A1 May 25, 2023

Related U.S. Application Data

(60) Provisional application No. 63/283,176, filed on Nov. 24, 2021.

(51) Int. Cl.
*G06T 11/60* (2006.01)
*G06T 11/20* (2006.01)

(52) U.S. Cl.
CPC ........... *G06T 11/60* (2013.01); *G06T 11/206* (2013.01); *G06T 2200/24* (2013.01)

(58) Field of Classification Search
None
See application file for complete search history.

(56) References Cited

U.S. PATENT DOCUMENTS

| 4,201,386 A | 5/1980 | Seale et al. |
| 5,115,504 A | 5/1992 | Belove et al. |

(Continued)

FOREIGN PATENT DOCUMENTS

WO   WO 2008/042232 A2   4/2008

OTHER PUBLICATIONS

Shakespear, Daniel. "Interactive Genealogy Explorer: Visualization of Migration of Ancestors and Relatives." BD. 2015. (Year: 2015).*

(Continued)

*Primary Examiner* — Ryan M Gray
(74) *Attorney, Agent, or Firm* — Fenwick & West LLP

(57) ABSTRACT

Disclosed are systems, computer-program products, and computer-implemented methods for the automatic estimation of geographic boundaries. Implementations of the foregoing may be useful for automatedly determining the geographic boundary of a community. In some embodiments, a computing device may receive birth location data related to the community. Enriched birth locations for the community may be determined based on likelihood metrics. An estimated geographic boundary of the community may be determined. The estimated geographic boundary may correspond to a probability density of the enriched birth locations represented using the geographical coordinates. A graphical user interface may present a map and the estimated geographic boundary of the community overlaying the map.

20 Claims, 12 Drawing Sheets

(56) References Cited

U.S. PATENT DOCUMENTS

| | | |
|---|---|---|
| 5,246,374 A | 9/1993 | Boodram |
| 5,413,908 A | 5/1995 | Jeffreys |
| 5,467,471 A | 11/1995 | Bader |
| 5,978,811 A | 11/1999 | Smiley |
| 6,049,803 A | 4/2000 | Szalwinski |
| 6,105,147 A | 8/2000 | Molloy |
| 6,277,567 B1 | 8/2001 | Graziosi |
| 6,528,260 B1 | 3/2003 | Blumenfeld et al. |
| 6,570,567 B1 | 5/2003 | Eaton |
| 7,957,907 B2 | 6/2011 | Sorenson et al. |
| 8,738,297 B2 | 5/2014 | Sorenson et al. |
| 8,855,935 B2 | 10/2014 | Myres et al. |
| 11,238,957 B2* | 2/2022 | Byrnes .................. G16B 20/20 |
| 11,514,627 B2* | 11/2022 | Jewett .................. G06T 11/206 |
| 2003/0113727 A1 | 6/2003 | Girn et al. |
| 2003/0172065 A1 | 9/2003 | Sorenson et al. |
| 2003/0204418 A1 | 10/2003 | Ledley |
| 2004/0122705 A1 | 6/2004 | Sabol et al. |
| 2004/0229231 A1 | 11/2004 | Frudakis et al. |
| 2004/0243531 A1 | 12/2004 | Dean |
| 2006/0020398 A1 | 1/2006 | Vernon et al. |
| 2006/0136143 A1 | 6/2006 | Avinash et al. |
| 2006/0161535 A1 | 7/2006 | Holbrook |
| 2007/0037182 A1 | 2/2007 | Gaskin et al. |
| 2008/0154566 A1 | 6/2008 | Myres et al. |
| 2014/0278138 A1* | 9/2014 | Barber .................. G06F 16/252 702/19 |
| 2015/0100243 A1 | 4/2015 | Myres et al. |
| 2017/0329891 A1* | 11/2017 | Macpherson .......... G16B 10/00 |
| 2019/0034587 A1* | 1/2019 | Anderson .............. G16B 40/00 |
| 2022/0357819 A1* | 11/2022 | Kozorezov ........ A61B 18/1492 |

OTHER PUBLICATIONS

Butler, J. M., "Commonly Used Short Tandem Repeat Markers," Forensic DNA Typing, Academic Press, Chapter 5, 2001, pp. 53-54.

Corach, D. et al., "Mass disasters: Rapid molecular screening of human remains by means of short tandem repeats typing," Electrophoresis, vol. 16, No. 1, Sep. 1995, pp. 1617-1623.

Family Tree DNA. "Family Tree DNA." Family Tree DNA: Genealogy by Genetics, LTD., Feb. 5, 2001, 2 pages, [Online] [Retrieved Aug. 1, 2023], Retrieved from the Internet Archive <URL:https://web.archive.org/web/20010205000900/http://www.familytreedna.com/main.html>.

Merriam-Webster. "Genealogy." Merriam-Webster Online Dictionary, Apr. 23, 2009, 1 page, [Online] [Retrieved Aug. 1, 2023], Retrieved from the Internet Archive <URL:https://web.archive.org/web/20090423124015/https://www.merriam-webster.com/dictionary/genealogy>.

Oxford Ancestors. "Oxford Ancestors: We Put the Genes in Genealogy." Oxfordancestors.com, Feb. 24, 2001, 3 pages, [Online] [Retrieved Aug. 1, 2023], Retrieved from the Internet Archive <URL:https://web.archive.org/web/20010224164734/http://www.oxfordancestors.com/>.

Pugh, M. B. et al., "Stedman's Medical Dictionary." Lippincott Williams & Wilkins, 27th Edition, 2000, p. 703.

Wilson, I. J. et al., "Genealogical Inference from Microsatellite Data," Genetics, vol. 150, Sep. 1998, pp. 499-510.

* cited by examiner

South German Mennonites

GRAPHICAL USER INTERFACE FOR PRESENTING GEOGRAPHIC BOUNDARY ESTIMATION

CROSS-REFERENCE TO RELATED APPLICATION

This application claims the benefit of U.S. Provisional Application No. 63/283,176 filed Nov. 24, 2021, which is hereby incorporated by reference in its entirety.

FIELD

The disclosed embodiments relate to systems, methods, and/or computer-program products configured for automatic estimation of geographic boundaries for graphical user interfaces.

BACKGROUND

A large-scale database such as a genealogy database can include billions of data records. This type of database may allow users to build family trees, research their family history, and make meaningful discoveries about the lives of their ancestors. Users may try to identify relatives with datasets in the database. However, identifying related individuals in the sheer amount of data is not a trivial task. Datasets associated with different individuals may not be connected without a proper determination of how the datasets are related. Comparing a large number of datasets without a concrete strategy may also be computationally infeasible because each dataset may also include a large number of data bits. Given an individual dataset and a database with datasets that are potentially related to the individual dataset, it is often challenging to identify a dataset in the database that is associated with the individual dataset.

Even if a group of related individuals are identified, it is often challenging to visualize the data representing at least some of the individuals. In some cases, a user might wish to visualize the data geographically. Despite the rapid pace of technological developments worldwide that has brought forth incredible innovations in computing technologies, genetics, and bioinformatics, the illustration of data for geographic boundaries could entail significant cost and complexity and be subject to human error.

SUMMARY

Disclosed herein relates to a computer-implemented method that includes defining a community including a plurality of individuals. The computer-implemented method may also include receiving birth location data of at least a subset of individuals selected from the plurality of individuals in the community. The birth location data may include geographic coordinates of a plurality of birth locations for the subset of individuals. The computer-implemented method may further include determining likelihood metrics for the plurality of birth locations, wherein a likelihood metric for a particular birth location corresponds to a likelihood that a member of the community is associated with the particular birth location. The computer-implemented method may further include identifying enriched birth locations for the community based on the likelihood metrics, the enriched birth locations being birth locations that are statistically significantly associated with the community. The computer-implemented method may further include determining an estimated geographic boundary of the community. The estimated geographic boundary may correspond to a probability density of the enriched birth locations represented using the geographical coordinates. The computer-implemented method may further include causing a graphical user interface to present the estimated geographic boundary of the community. The estimated geographic boundary overlays a map presented in the graphical user interface.

In some embodiments, determining the estimated geographic boundary for the community may include: generating a three-dimensional map including the geographic coordinates of the enriched birth locations plotted in x and y dimensional space and the likelihood metrics associated with the enriched birth locations plotted in a z-dimension; determining a distribution of an overall probability density of the enriched birth locations; and defining the estimated geographic boundary as a x,y-plane cross-section of the distribution at a selected z-value.

In some embodiments, determining the distribution of the overall probability density of the enriched birth locations includes using kernel density estimation.

In some embodiments, identifying the enriched birth locations for the community may include: filtering the enriched birth locations based at least in part on a range of birth years or a geographical range of birth locations.

In some embodiments, the likelihood metrics for the particular birth location corresponds to an odds ratio of a match frequency to a background frequency, the match frequency is the frequency of members of the community having the particular birth location, and the background frequency is the frequency of individuals outside of the community having the particular birth location.

In some embodiments, the estimated geographical boundary is adjustable manually through the graphical user interface.

In some embodiments, at least part of the estimated geographical boundary is adjusted to a county line that defines one of the enriched birth locations.

In some embodiments, the computer-implemented method may further include receiving birth year data and the enriched birth locations are filtered by a range of birth years.

In some embodiments, identifying enriched birth locations includes using a Fisher's Exact Test to determine whether a candidate enriched birth location is statistically significantly associated with the community.

In some embodiments, the community is a genetic community.

In some embodiments, determining the genetic community may include: representing a population of individuals in a graph and connecting the individuals of the population based on identity-by-descent (IBD) match DNA segments of the individuals; grouping the individuals represented in the graph into one or more clusters; and defining one of the clusters as the genetic community.

In some embodiments, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

Figure 1:
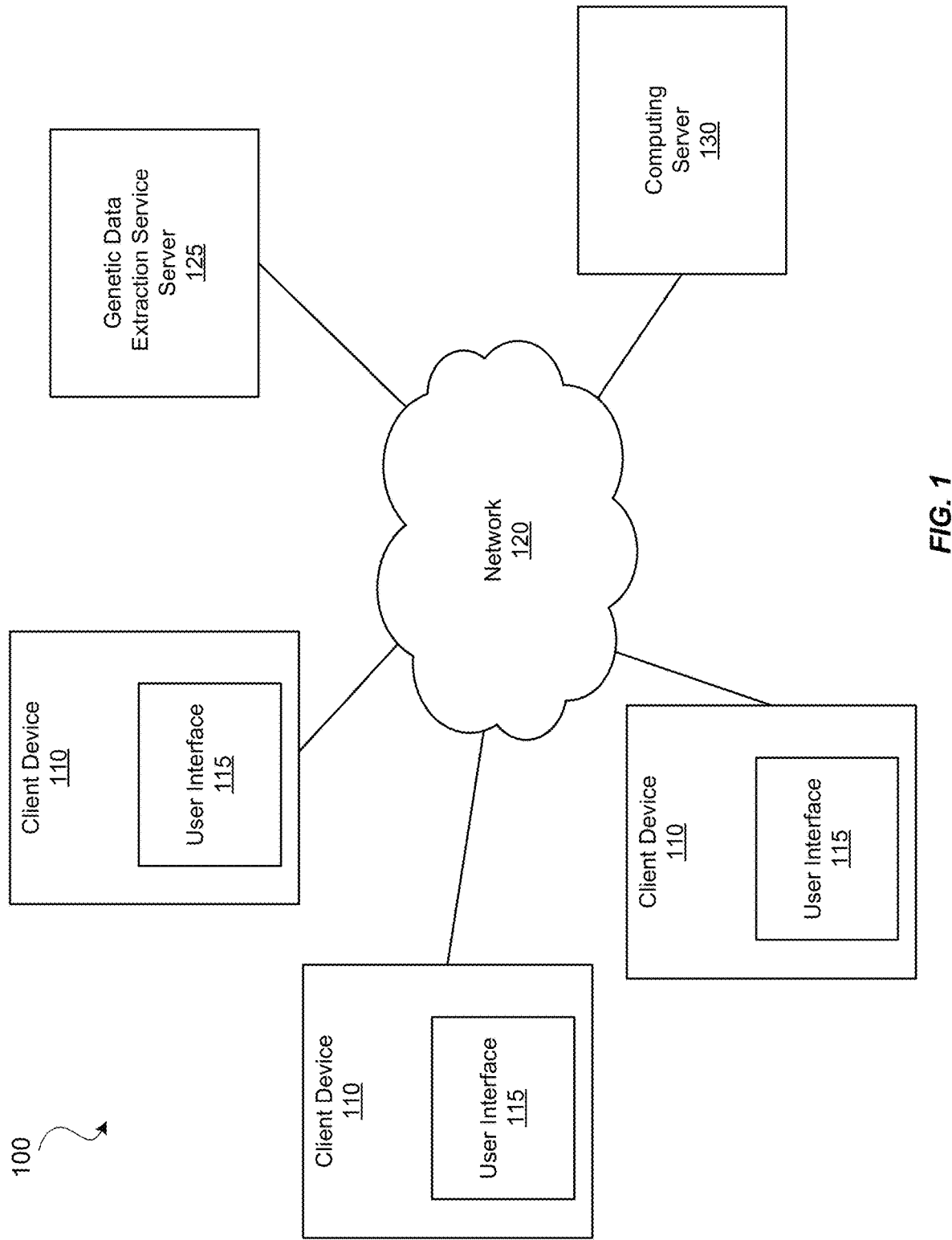
FIG. 1 illustrates a diagram of a system environment of an example computing system, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Genetic research services provide insights into a user's ancestry. For example, a user may submit a DNA sample to the genetic research service and in return receive insights into their ethnic and/or community heritage. In some embodiments, a user may be assigned to a community, which represents, for example, related individuals that represent the user's ancestry in the relatively recent past.

For example, genetic communities may rely, at least in part, on the number and/or length of genetic identity-by-descent ("IBD") segments shared between the user and other users whose samples have been submitted to the genetic research service. A particular community may be identified from a cluster analysis of shared IBD segments, for example, using a multi-level Louvain method. Classifiers may be built for assigning individuals to one or more communities. Additionally, enriched birth locations (determined using an enrichment analysis of genealogical data of the community members) corresponding to one or more time periods, a list of community members, genealogical trees pertaining to the community members, etc. may be determined and provided.

A particular community may be determined to have a geographical extent, for example based on the enriched birth locations of the community members. The determination of geographic boundaries for genetic communities conventionally remains a manual process, entailing significant cost and complexity, and being subject to human error and subjectivity. For instance, a geographical extent of a community may be based on ancestral birth locations of people in that community (e.g., the enriched birth locations), with the geographical boundary (including, defining, or represented as polygons) being drawn manually therearound and/or therewith. Such polygonal community boundaries provide customers with enriched geographic information about where their recent ancestors resided and often adhered to historical descriptions of the geography (local, county, or state boundaries, city locations and historical sprawl, etc.) in their creation.

The manual determination of such community boundaries often includes the use of manual laborers who draw the polygons based on, e.g., the enriched birth locations of community members, historically relevant cartographic and geographic data, as well as statistical analyses of the populations within and outside of the determined boundary. In many instances, the hand-drawn community boundaries are revised in view of statistical analyses of the community members in and/or around the proposed boundary.

This can include, for example, an analysis of the proportion of individuals (both community members and non-members of the community, for example as determined by a community-specific classifier) having birth locations within the defined community boundary. Other components of the statistical analysis may include ethnicity, continental admixtures, ancestors in family trees, a proportion of community members who have family trees, family tree sizes, etc. The manually created geographic boundaries are validated as acceptable if the proportion of community members with birth locations within the manually drawn boundary is determined to be significantly higher than the proportion of non-members of the community having birth locations within the same boundary. If the proposed community boundary fails to be validated by statistical analysis, it requires correction. Problematically, however, the known methods for community boundary creation fail to identify which portion(s) of the manually drawn boundary would benefit from revision or what such a revision would look like to ensure the amended community boundary can be statistically validated.

Thus, the determination of geographic boundaries of a genetic community entails an iterative process involving both the manual drawing of geographic boundaries based on enriched birth locations and subsequent performance of statistical analysis thereon, which many initial boundary predictions fail, restarting the manual process or, at the very least, resulting in making a revision to the boundary. This delays the process of finalizing the geographic scope of a genetic community and subsequent assignment of individuals, and other processes downstream to having a defined genetic community, such as content generation for the community, are similarly delayed until the determination of geographic boundaries is complete.

Embodiments of geographic boundary estimation for communities systems and methods address shortcomings in the art by enabling automated data-driven generation of geographic polygons for genetic communities. In some embodiments, two-dimensional kernel density estimation is used to draw contours/polygons based on, e.g., enriched birth locations. Enriched birth locations may be limited to within a certain time period (which may be predetermined) and/or to within certain geographical areas, e.g., continents like the Americas, Europe, etc.

This advantageously reduces the cost, complexity, and inherent error and subjectivity associated with manually determining community geographic boundaries, as automatically generated polygons can be used to determine statistical suitability, whereupon corresponding content may be generated and/or refinements to the geographic boundaries may be performed.

In some embodiments, enriched birth locations are determined by receiving, from a community-specific classifier, a list of people inside the community and outside the community, receiving, from a tree database, family tree data including birth year and birth locations of at least a portion of the people inside the community plus ancestors thereof, performing a test such as Fisher's Exact Test to identify birth locations enriched for a community in time periods, e.g., based on 25 year time periods, and then outputting locations (expressed as latitude/longitude), time period, and/or an odds ratio of belonging to the community. Enriched birth locations may be determined using the process described in U.S. Pat. No. 11,238,957, granted Feb. 1, 2022, and/or U.S. Pat. No. 10,957,422, granted Mar. 23, 2021, each of which is hereby incorporated in its entirety by reference.

In some embodiments, for a genetic community, enriched birth locations, birth year, and likelihood metrics may be determined or retrieved. In some embodiments, an enriched birth location is a birth location that is over-represented in a community during a period of time and may be determined as a function of a likelihood metric and a frequency. The likelihood metric may take the form of an odds ratio. The odds ratio may be the odds that, at a given location such as a given birth location, an individual is a member of the community over the odds that an individual is not a member of the community, for example as determined using the community-specific classifier. The odds ratio may signify how likely a person having a given birth location belongs to a particular community. The frequency may refer to the fraction of individuals born in a geographic region that are members of the community and the total number of individuals born at the location. An enriched birth location may include a set of all rounded latitude-longitude grid points with an odds ratio above a predetermined threshold, indicating a geographic location with a relative enrichment of birth locations.

The birth locations may be represented as longitudes and latitudes but may be determined or represented using any suitable modality. Each birth location may represent a plurality of community members, with the density reflected by the odds ratio.

In some embodiments, a filter step may be applied to, for example, the enriched birth locations, birth year, and/or odds ratios. The filter may be, in some embodiments, one or more birth years. For example, for German communities prior to migration to the US, birth years could be restricted based on known or estimated migration periods. Alternatively, additionally, or subsequently, the enriched birth locations, birth year, and/or odds ratios may be filtered based on birth locations, such as birth locations based on locations. For example, for German communities prior to migration to the US, the locations may be filtered to represent or keep only European birth locations as opposed to North American birth locations.

A two-dimensional kernel density estimation may be performed to estimate a probability density of birth locations weighted by the odds ratio. Input for the two-dimensional kernel density estimation may include birth locations of the community members after any filtering steps have been performed. Outputs from the two-dimensional kernel density estimation may include a set of contours in a two-dimensional latitude-longitude coordinate system. Contours may range from smallest to largest area corresponding to the highest to lowest concentration of birth locations. These contours correspond to the geographical boundaries of the genetic communities.

In some embodiments, densities of the two-dimensional kernel density estimation, reflected by the odds ratio and therefore reflecting the number of community members associated with a birth location and weighted by the probability of said community members belonging to the community, may be represented In some embodiments, where the boundaries identified by the two-dimensional kernel density estimation are determined to be larger than expected, the two-dimensional kernel density estimation may be repeated with stricter longitude and latitude limits. The limits may be chosen as a bounding box defined for the second-largest contour from the original two-dimensional kernel density estimation. In some embodiments, expectations for the contours may be based on current or historical geographical boundaries (e.g., national, state, county, or city borders), geographical features such as rivers, mountain ranges, etc., or any other suitable feature.

It has been surprisingly found that the approach described herein for geographic boundary estimation for genetic communities advantageously improves and expedites the process of determining boundaries for communities, as demonstrated using communities in Latin America (e.g., Venezuela) and Germany (specifically South German Mennonites and Swiss), with close alignment between automatically determined geographic boundaries and hand-drawn boundaries.

In some embodiments, region-specific time-period cutoffs may be determined. The time-period cutoffs may also or alternatively be community-specific. In other embodiments, historical trends, demographic trends, or any other trends can be used for filtering the enriched birth locations, birth year, and/or odds ratios.

Example System Environment

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more subnetworks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various nextgeneration sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, and phenotypes are examples of biomarkers.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2:
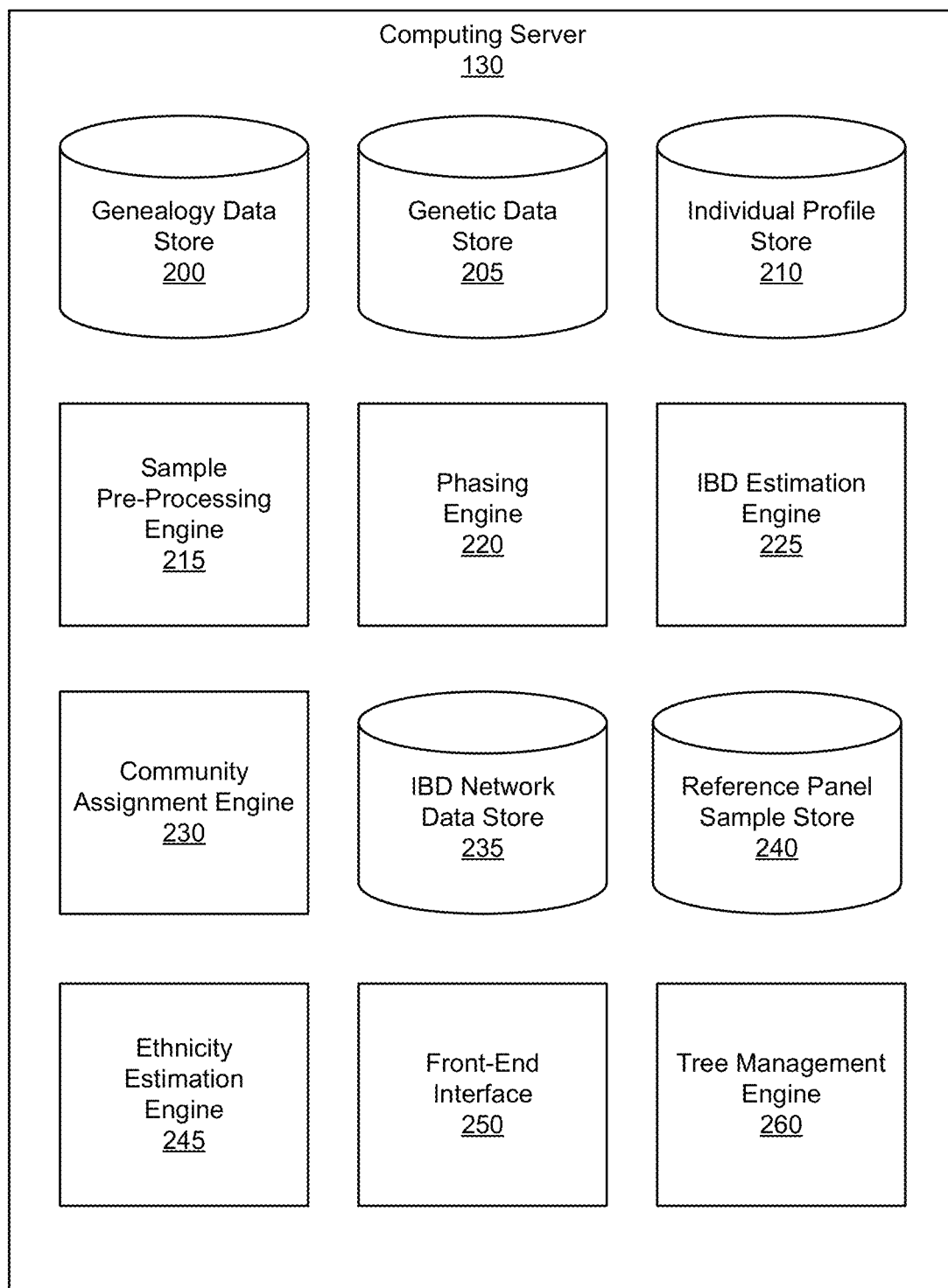
FIG. 2 is a block diagram of an architecture of an example computing system, in accordance with some embodiments.

FIG. 2 is a block diagram of an architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 250, and a tree management engine 260. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP loci (e.g., allele sites)

filtered from the sequencing results. A SNP locus that is single base pair long may also be referred to a SNP site. A SNP locus may be associated with a unique identifier. The genetic dataset may be in a form of diploid data that includes a sequencing of genotypes, such as genotypes at the target SNP loci, or the whole base pair sequence that includes genotypes at known SNP loci and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g. stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and researches conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing. Other example phasing embodiments are described in U.S. Patent Application Publication No. US 2021/0034647, entitled "Clustering of Matched Segments to Determine Linkage of Dataset in a Database," published on Feb. 4, 2021.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a genetic community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., containing fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry.

The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020 and U.S. Pat. No. 10,692,587, granted on Jun. 23, 2020, entitled "Global Ancestry Determination System" describe different example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and those in the potential family trees through one or more machine learning models or other heuristic algorithms. For example, the tree management engine 260 may try putting the target individual in various possible locations in the family tree and determine the highest probability position(s) based on the genetic dataset of the target individual and genetic datasets available for others in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Patent Publication Application No., entitled "Linking Individual Datasets to a Database," US2021/0216556, published on Jul. 15, 2021, describes example embodiments of how an individual may be linked to existing family trees.

Example Geographic Boundary Generation Process

Figure 3:
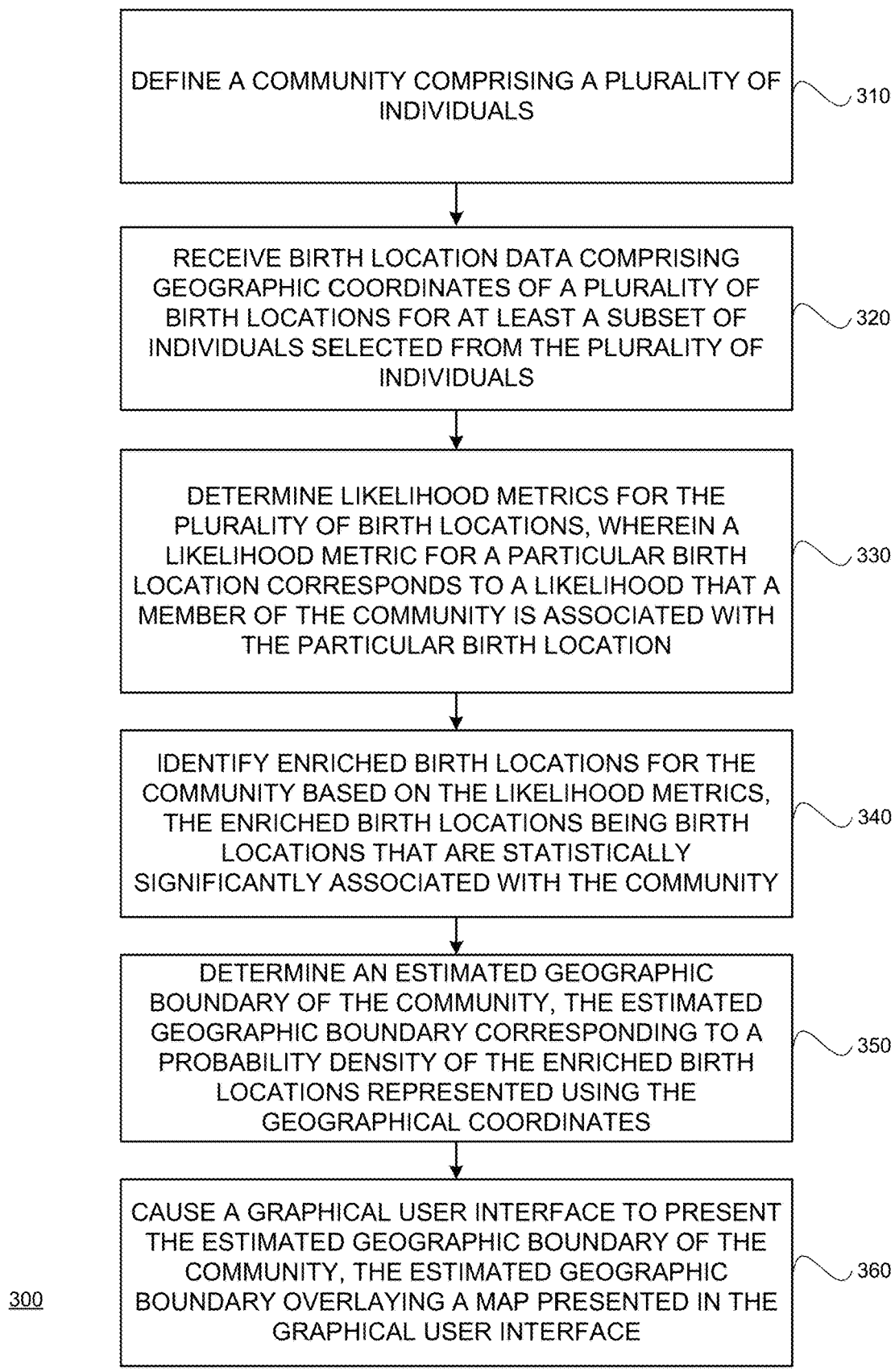
FIG. 3 is a flowchart depicting an example process for generating a geographic boundary for a community, in accordance with some embodiments.

FIG. 3 is a flowchart depicting an example process 300 for generating a geographic boundary for a community, in accordance with some embodiments. The process may be performed by computing devices such as the computing server 130. The process 300 may be embodied as a software algorithm that may be stored as computer instructions that are executable by one or more processors. The instructions, when executed by the processors, cause the processors to perform various steps in the process 300. In various embodiments, the process may include additional, fewer, or different steps. While various steps in process 300 may be discussed with the use of computing server 130, each step may be performed by a different computing device.

In some embodiments, the process 300 includes defining a community that includes a collection of individuals (step 310). The community can be manually defined or automatically defined, such as by the computing server 130. For example, a user of the computing server 130 may manually select or combine one or more groups of individuals to form a community. A user may browse various genealogy records in the genealogy data store 200 and select individuals with certain metadata tags as part of the community. Metadata tags could be based on names, migration history, marriage history, years of important life events, and other tags that may be available in the genealogy data store 200. In another example, a user may also browse various family trees and select individuals in various family trees to assign those individuals to a community. Likewise, the computing server 130 may automatically concatenate multiple family trees to form a community. In yet another example, a community may also be an existing community based on a record, such as people who live in a certain location (e.g., the same town, the same city) in a particular time period. Other suitable ways to define a community are also possible in various embodiments.

In some embodiments, the community is a genetic community that the computing server 130 defines using one or more algorithms to identify a group of individuals. A genetic community may be a community that one or more algorithms determine that the individuals in the community have similar genetic data. The genetic similarity among individuals may be determined using one or more suitable algorithms described in various engines associated with FIG. 2, such as the IBD estimation engine 225, the community assignment engine 230, and the ethnicity estimation engine 245 to define a genetic community. In some cases, a genetic community may correspond to an ethnic group or an ethnic sub-group. In other cases, a genetic community may be determined largely based on algorithms that analyze genetic data. An individual may be assigned to more than one genetic community. An individual in a community may be a current user, a past user, a current individual, a historical individual such as an ancestor, or another suitable individual.

In some embodiments, a genetic community may be an identity-by-descent related genetic community that groups individuals based on IBD match DNA segments among the individuals. The computing server 130 may use a clustering algorithm that is described in the community assignment engine 230 to identify genetic communities. By way of example, computing server 130 may represent a population of individuals in a graph. The nodes in the graph may each represent an individual. In various embodiments, the population may include a large number of individuals. For example, in some embodiments, the population includes more than 10,000 individuals. In some embodiments, the population includes more than 100,000 individuals. In some embodiments, the population includes more than 500,000 individuals. In some embodiments, the population includes more than 1,000,000 individuals. In some embodiments, the population includes more than 5,000,000 individuals.

In the graph, the computing server 130 may connect the individuals of the population based on IBD match DNA segments of the individuals. For example, the edges of the group, each connecting two nodes, may be measured by the IBD affinities between individuals. An IBD affinity may be a metric that measures the length of the total IBD match segments shared between two individuals. The length may be weighted to de-emphasize commonly shared IBD segments that are presented in a population. Additional detail on how the total length of IBD segments may be determined is described in association with the IBD estimation engine 225. The connections among individuals may be filtered by a minimum threshold length of shared IBD segments so that only individuals who have significant genetic connections are represented as connected nodes in the graph, which may be referred to as an IBD network.

After the nodes and the edges are set up, the computing server 130 may group the individuals represented in the graph into one or more clusters. For example, the computing server 130 may use the community assignment engine 230 that applies clustering techniques such as modularity measurement (e.g., the Louvain method) to classify nodes into different clusters in the IBD network. The computing server 130 may run the clustering algorithms multiple times, whether using the whole IBD network or using only an identified cluster, to define sub-clusters. The computing server 130 may also combine one or more clusters or sub-clusters into a super-cluster. The computing server 130 may, in turn, define one of the clusters, whether it is a regular cluster, sub-cluster, or supercluster, as the genetic community.

The individuals who are assigned to a community may be referred to as community members. A community may also be defined by aggregating one or more communities that are generated from various ways discussed above, such as by combining communities, finding an intersection between two communities (e.g., only common members of two communities), etc.

With continued reference to FIG. 3, the process 300 can additionally include receiving birth location data of at least a subset of individuals selected from the individuals in the community (step 320). For example, the computing server 130 may retrieve the birth location data from the individual profile store 210 or the genealogy data store 200 for the individuals who have birth location data stored in the computing server 130. In some embodiments, not every community member has birth location data stored in the computing server 130. The computing server 130 may retrieve at least a subset of community members who have the birth location data. In some embodiments, some community members may not have direct birth location data but are associated with family trees stored in the computing server 130. The computing server 130 may retrieve the family tree data from a tree database and use birth location data in the family tree as substitutes or additional data points for the birth locations.

For example, the most common birth location(s) in a family tree, and the birth location(s) of the close relatives (e.g., parents, children, etc.) of a community member who does not have the direct birth location may be used. Other suitable selection rules of birth locations from family tree data may also be used. In some embodiments, whether the data is direct birth location or family tree data, the data may be referred to as birth location data and the birth location may be referred to as a birth location associated with a community member. In some embodiments, birth location or related data may be inferred for community members whose profiles and/or associated family trees lack such data. For example, birth location or other suitable data may be inferred by performing a record search for the pertinent community member and inferring a datum from an identified, relevant record, such as a birth, marriage, or death record for the community member or related person.

The birth location data may include geographic coordinates of a plurality of birth locations associated with the subset of community members. For example, a community member may have birth location data stored in the computing server 130. The birth location may be a named location. The computing server 130 may assign the named location to a set of geographic coordinates. For example, a city or a county may be converted to the geographic coordinates of the city or county center. Some birth locations may also be historical. The computing server 130 may refer to genealogy or other historical records to determine the geographic coordinates of a birth location.

In some embodiments, the computing server 130 may also receive additional data such as birth year data and other data related to some of the community members. For example, the birth year data may be included in the family tree data associated with some of the community members. The computing server 130 may use the received additional data to perform downstream filtering that will be discussed in further detail below.

With continued reference to FIG. 3, the process 300 can additionally include determining likelihood metrics for the plurality of birth locations associated with the community members (step 330). In some embodiments, a likelihood metric for a particular birth location corresponds to the likelihood that a member of the community is associated with the particular birth location. The likelihood may be normalized by the background likelihood of a non-member who is associated with the particular birth location. A likelihood metric may be defined differently in various embodiments. Any suitable definitions, such as using conditional probability, statistical test, or statistical ratio, may be used to define the likelihood metric.

By way of example, the likelihood metric may take the form of an odds ratio. The odds ratio for the particular birth location may correspond to a ratio of a match frequency to a background frequency. The match frequency is the frequency of members of the community having the particular birth location. The background frequency is the frequency of individuals outside of the community having the particular birth location. In some embodiments, in defining a community, the computing server 130 may classify a population of individuals (PEEPS) as those who belong to a given community (COM+) and those who do not belong to that community (COM−). In some embodiments, birth locations and birth years are retrieved for the PEEPS and their ancestors. For a given birth location and window of birth years, a PEEP (or respective ancestor) is either born there (LOC+) or born somewhere else (LOC−). Using a two-binary system, a PEEP can be assigned as one of the following:

COM+LOC+=a member of the community born at the chosen location;

COM+LOC−=a member of the community born anywhere other than the chosen location;

COM−LOC+=not a member of the community born at the chosen location; or

COM−LOC−=not a member of the community born anywhere other than the chosen location.

In some embodiments, an odds ratio may be calculated for a birth location as follows:

ODDS RATIO=[(COM+LOC+)/(COM+LOC−)]/
 [(COM−LOC+)/(COM−LOC−)].

The odds ratio as discussed above is merely one example of how a likelihood metric may be defined. In various embodiments, other statistical approaches may be used to define a likelihood metric.

With continued reference to FIG. 3, the process 300 can additionally include identifying enriched birth locations for the community based on the likelihood metrics (step 340). The enriched birth locations are birth locations that are statistically significantly associated with the community. The computing server 130 may collect a set of birth locations that are associated with various community members. The computing server 130 may use a significance test to identify one or more birth locations that are enriched with the community. For example, the computing server 130 may use a Fisher's Exact Test to determine whether a candidate enriched birth location is statistically significantly associated with the community. U.S. Pat. No. 10,957,422, granted Mar. 23, 2021, entitled "Genetic and Genealogical Analysis for Identification of Birth Location and Surname Information" provides more examples of likelihood metrics, match frequency, background frequency, odds ratio, and enriched birth location and is incorporated by reference in its entirety.

In some embodiments, identifying the enriched birth locations for the community may also include filtering the enriched birth locations based on one or more other factors. For example, the filtering may be at least in part on a range of birth years or a geographical range of birth locations. For example, if only enriched birth locations for the range of years 1850-1900 are of interest, the filter may remove the birth locations that are associated with other birth years and conduct the significance test. The geographical range may be used to filter the enriched birth locations to be limited to a particular area, such as a continent, a country, a local region, a hand-drawn boundary, etc. The enriched birth locations may also be filtered by a threshold value of the likelihood metrics. For example, only enriched birth locations that have a certain level of likelihood are selected for further analysis.

With continued reference to FIG. 3, the process 300 can additionally include determining an estimated geographic boundary of the community (step 350). The estimated geographic boundary may correspond to a probability density of the enriched birth locations represented using the geographical coordinates. For example, the computing server 130 may generate a three-dimensional probability density function based on the coordinates of the enriched birth locations and the likelihood metrics. The coordinates may represent discrete locations in a two-dimensional map. The value of the likelihood metric at each enriched location may represent the value at each discrete location. Various smoothing techniques and aggregation techniques may be used to generate a distribution in three-dimensional space based on those discrete locations and values. In some embodiments, the computing server 130 may apply kernel density estimation to generate the probability distribution. Other distribution fitting techniques may also be used, parametric or non-parametric, such as a histogram approach.

Figure 5:
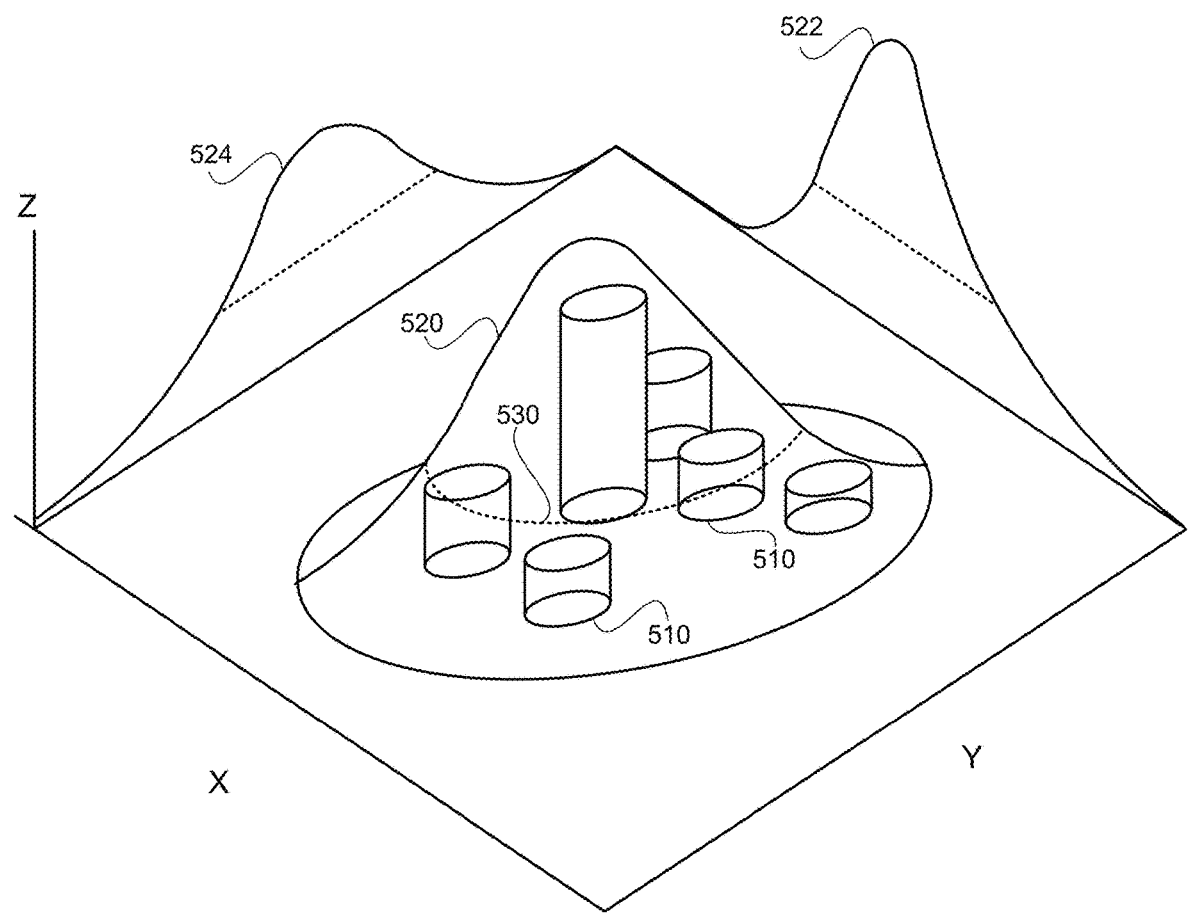
FIG. 5 is a conceptual diagram illustrating of how estimated geographical boundaries may be generated, in accordance with some embodiments.

After a three-dimensional probability distribution is generated and overlaid on a map, one or more estimated geographical boundaries of the community may be generated by taking two-dimensional cross-sections of the distribution. For example, cross-sections may be taken at 90%, 80%, 70%, 60%, . . . 10% of the peak to generate a series of contours that represent the geographical boundaries. Selection of other values may also be possible to generate the estimated geographical boundaries. FIG. 5 has a graphical illustration of how estimated geographical boundaries may be generated, in accordance with some embodiments.

In some embodiments, where the boundaries identified by the two-dimensional kernel density estimation are determined to be larger than expected, the two-dimensional kernel density estimation may be repeated with stricter longitude and latitude limits. The limits may be chosen as a bounding box defined for the second-largest contour from the original two-dimensional kernel density estimation. In some embodiments, expectations for the contours may be based on current or historical geographical boundaries (e.g., national, state, county, or city borders), geographical features such as rivers, mountain ranges, etc., or any other suitable features.

With continued reference to FIG. 3, the process 300 can additionally include causing a graphical user interface to present the estimated geographic boundary of the community (step 360). The estimated geographic boundary may overlay a map presented in the graphical user interface. For example, the map may be a digital map such as an open-source map that is readily available. Data of the coordinates of one or more estimated geographical boundaries may be applied to the map to cause the estimated geographical boundaries to overlay on the map.

The graphical user interface may provide various features for a user to review various enriched birth locations and estimated geographical boundaries. For example, the graphical user interface may include control elements for a user to filter enriched locations based on one or more factors such as a range of birth years or a geographical range of birth locations. The graphical user interface may also break an estimated geographical boundary as a series of connection points so that the estimated geographical boundary is adjustable manually by moving the connection points. In some embodiments, an estimated geographical boundary may be adjusted to conform with certain map lines, such as coastlines, country lines, county lines, etc. For example, an estimated geographical boundary may be a result of an automated distribution boundary. The area within the estimated geographical boundary may include a sea. As such, the estimated geographical boundary may be adjusted, manually or automatically, to better conform to the map situation in the locality of the geographical boundary.

The end result with a geographical boundary of a community overlaying on a map may be presented to a user to review. For example, a user may be determined to be a member of a genetic community based on the user's genetic data and the computing server 130 presents more information about the genetic community, such as the estimated geographical boundary associated with enriched birth locations of the community, to the user via a graphical user interface.

Figure 4:
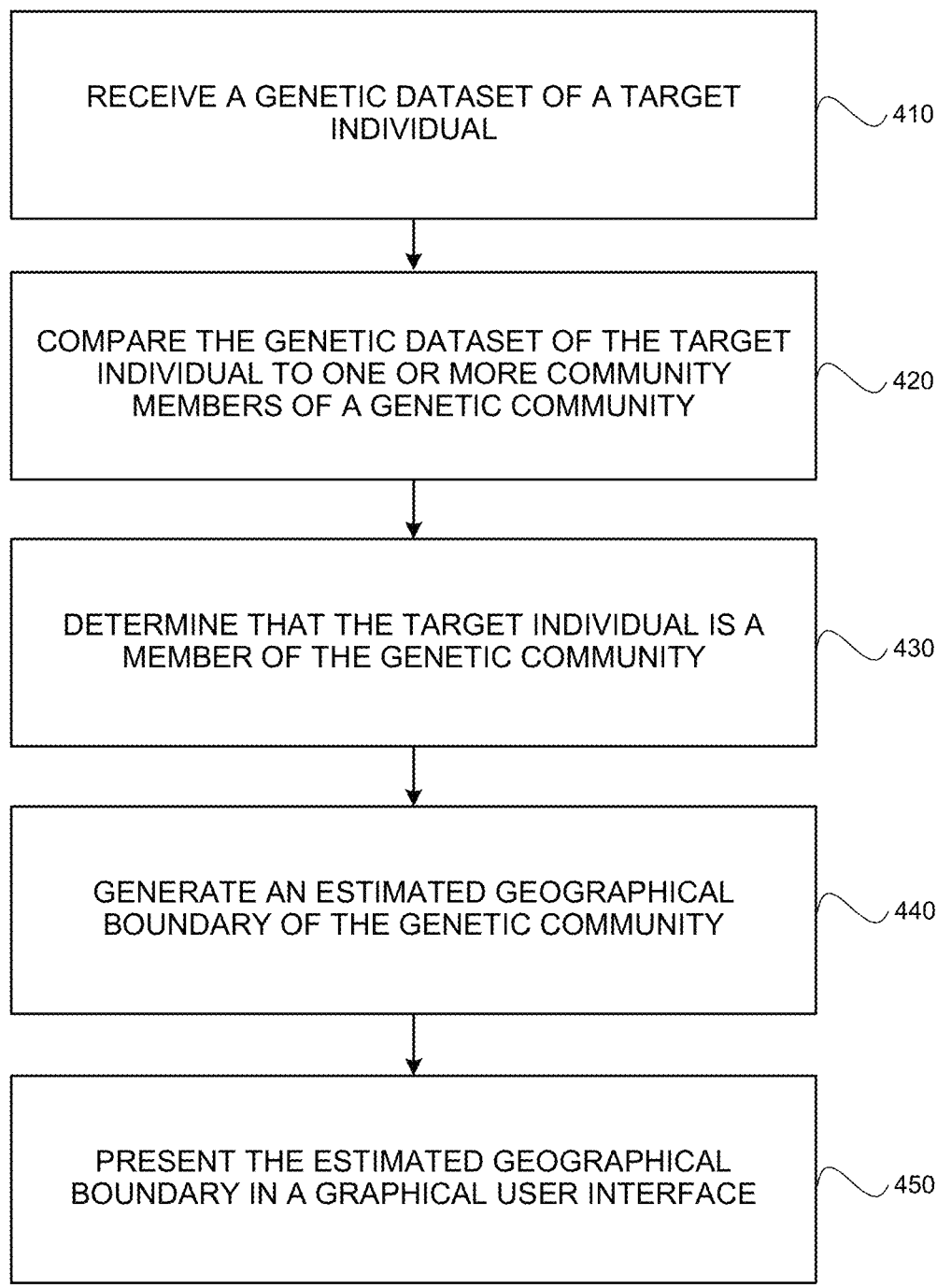
FIG. 4 is a flowchart depicting an example process for presenting information related to a genetic community to a user, in accordance with some embodiments.

FIG. 4 is a flowchart depicting an example process 400 for presenting information related to a genetic community to a user, in accordance with some embodiments. The process may be performed by computing devices such as the computing server 130. The process 400 may be embodied as a software algorithm that may be stored as computer instructions that are executable by one or more processors. The instructions, when executed by the processors, cause the processors to perform various steps in the process 400. In various embodiments, the process may include additional, fewer, or different steps. While various steps in process 400 may be discussed with the use of computing server 130, each step may be performed by a different computing device.

In some embodiments, the process 400 can include receiving a genetic dataset of a target individual (e.g., the user) (step 410). The process 400 can include comparing the genetic dataset of the target individual to one or more community members of a genetic community (step 420). For example, the computing server 130 may use various engines such as phasing engine 220, the IBD estimation engine 225, the community assignment engine 230, and ethnicity estimation engine 245 to process the genetic dataset of the target individual and compare the genetic dataset to community members of the genetic community. The community members who are used to compare the genetic data may be one or more reference panels from the reference panel sample store 240.

Based on the comparison results, the process 400 can include determining that the target individual is a member of the genetic community (step 430). For example, the computing server 130 may use the community assignment engine 230 to include the target individual in an IBD network and determine that the target individual is included in one or more clusters in the IBD network. In another case, the computing server 130 may use the IBD estimation engine 225 to compare the genetic dataset of the target individual to those of reference panels of a genetic community. If the total shared IBD segments between the target individual and a reference panel are longer than a threshold, the computing server 130 may determine the target individual is a member of the genetic community.

In some embodiments, a community-specific classifier may be used to determine whether a target individual is a member of the genetic community. For example, the community assignment engine 230 may generate a set of community members. The set of community members' DNA data may be used as positive training samples for a supervised machine learning model. The training samples may include one or more reference panels of the community. The DNA data of other individuals who are not members of the community may be used as negative training samples. In training the community-specific classifier, the community-specific classifier may be used to predict the labels of the training samples and compare the predicted labels to the active labels. In backpropagation, the weights of the community-specific classifier may be adjusted in the direction to reduce the error rate, e.g., as monitored by a value of a loss function, of the community-specific classifier. After the community-specific classifier is trained, the target individual's DNA data may be input into the community-specific classifier to determine whether the target individual is a community member. The computing server 130 may have identified a number of communities and each community may include its own community-specific classifier.

With continued reference to FIG. 4, the process 400 can include generating an estimated geographical boundary of the genetic community (step 440). The generation of the estimated geographical boundary is described in the process 300. The process 400 can include presenting the estimated geographical boundary in a graphical user interface (step 450). The estimated geographical boundary may be overlaid on a map.

While process 300 and process 400 are discussed using birth locations as an example. In some embodiments, other types of locations may also be selected based on enrichment and a geographical boundary may also be estimated using the process 300. Examples may include enriched surnames and the surnames may be converted to geographical locations based on origins. Marriage locations and other life event locations may also be used in some embodiments.

Example Density Distribution Determination Process

FIG. 5 is a conceptual diagram illustrating an example process for determining a probability density distribution in a three-dimensional space in order to generate an estimated geographical boundary for enriched birth locations associated with a community, in accordance with some embodiments.

In some embodiments, the computing server 130 may generate a three-dimensional map that x and y dimensional spaces as the geographical map. The z-dimension may be used to track the values of the likelihood metrics, such as the values of the odds ratios. In FIG. 5, the enriched birth locations are represented as the circles 510 and are plotted in the x and y dimensional space based on the geographical coordinates of the enriched birth locations. The magnitudes of the likelihood metrics associated with different enriched birth locations are plotted in the z-dimension. In FIG. 5, this is illustrated as the heights of the circular cylinders.

Based on the plots and the values of the likelihood metrics, the computing server 130 may apply one or more distribution fitting techniques such as kernel density estimation to determine a distribution of an overall probability density of the enriched birth locations. In FIG. 5, the determined distribution is illustrated as a three-dimensional distribution 520. The x-dimension projection and the y-dimension projection of the three-dimensional distribution 520 are respectively illustrated as the distribution 522 and the distribution 524.

After the distribution 520 is determined, the computing server 130 may define the estimated geographic boundary as a x,y-plane cross-section of the three-dimensional distribution 520 at a selected z-value. For example, the x,y-plane cross-section at a selected z-value is illustrated as a dotted line 530. The cross-section using the level of dotted line 530 to cut through the distribution 520 generates a contour that can be shown in x,y-plane. The contour may be used as an example of the estimated geographical boundary. Additional estimated geographical boundaries may be generated using different z values. The contours generated may also be referred to as polygons.

Example Graphical User Interfaces

Figure 6A:
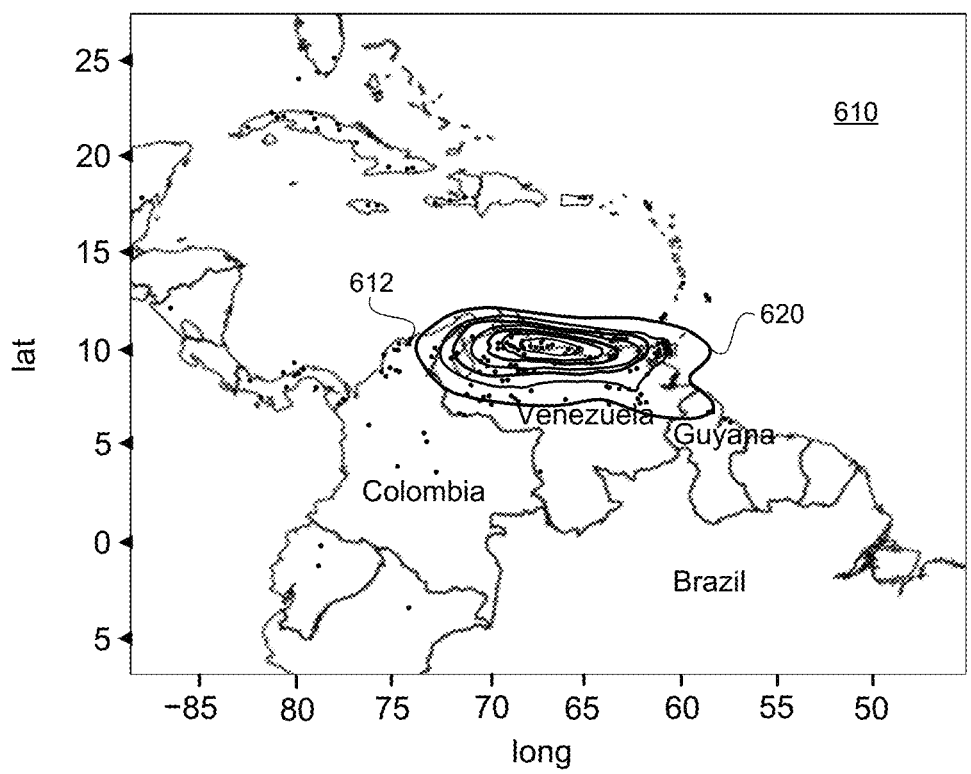
FIG. 6A is a conceptual diagram of an example of graphical user interface that illustrates a series of estimated geographical boundaries overlaying on a map, in accordance with some embodiments.

FIG. 6A is a conceptual diagram of an example of a graphical user interface that illustrates a series of estimated geographical boundaries overlaying on a map 610, in accordance with some embodiments. The map 610 may be a digital geographical map such as an open-source map. The graphical user interface may render the map 610 and also receives data related to the coordinates of the enriched birth locations associated with a community and the coordinates of the estimated geographical boundaries. In turn, the graphical user interface may render the enriched birth locations as a number of dots 612 on the map 610. The graphical user interface may also render the estimated geographical boundaries 620 as a series of contours.

Figure 6B:
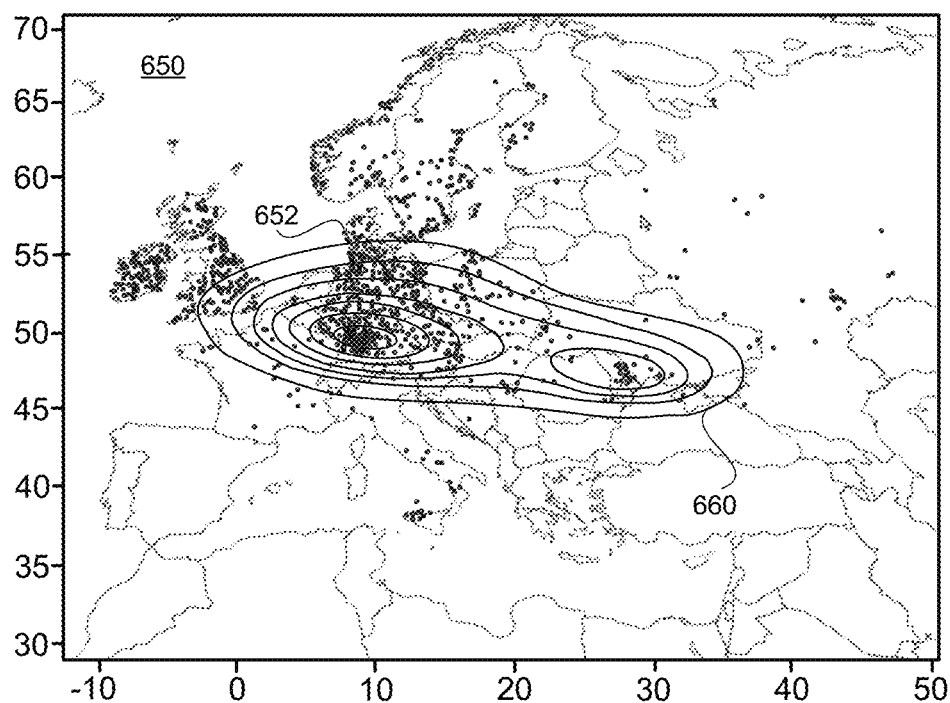
FIG. 6B is a conceptual diagram of another example of a graphical user interface that illustrates a series of estimated geographical boundaries overlaying on a map, in accordance with some embodiments.

FIG. 6B is a conceptual diagram of another example of a graphical user interface that illustrates a series of estimated geographical boundaries overlaying on a map 650, in accordance with some embodiments. Similar to the map 610, the graphical user interface may render the enriched birth locations as a number of dots 652 on the map 650. The graphical user interface may also render the estimated geographical boundaries 660 as a series of contours. The estimated geographical boundaries 660 show a migration pattern of the people belonging to a genetic community from Germany towards the east.

It has been surprisingly found that the approach described herein for geographic boundary estimation for genetic communities advantageously improves and expedites the process of determining boundaries for communities, as demonstrated using communities in Latin America (e.g., Venezuela) and Germany (e.g., South German Mennonites) as shown in FIGS. 6A and 6B. The automatically determined geographic boundaries have close alignment with conventional hand-drawn boundaries but at much lower cost and are generated much more quickly than the hand-drawn boundaries.

Figure 7A:
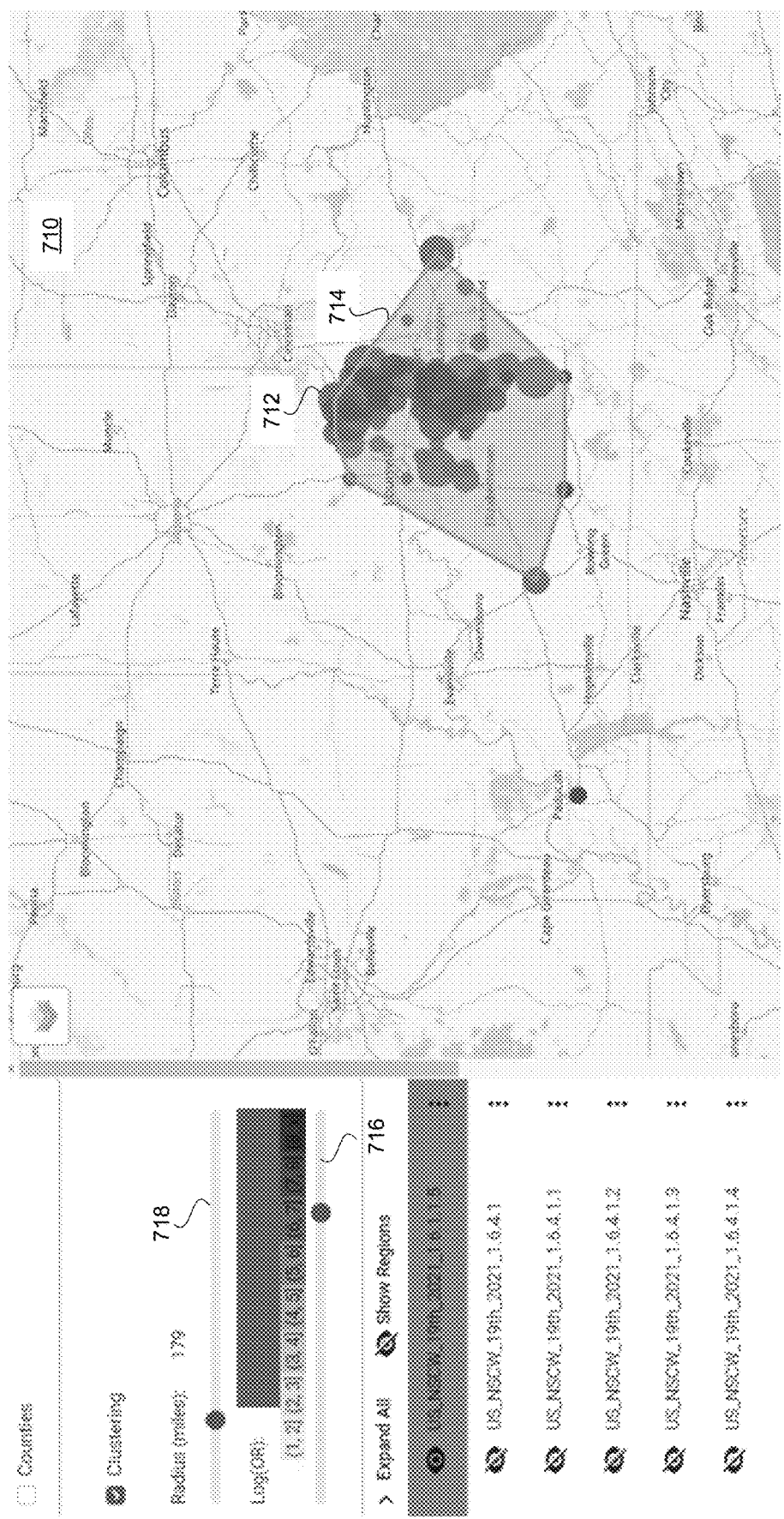
FIG. 7A is a conceptual diagram of another example of a graphical user interface that illustrates the representations of enriched birth locations based on values of likelihood metric, in accordance with some embodiments.

FIG. 7A is a conceptual diagram of another example of a graphical user interface that illustrates the representations of enriched birth locations based on values of likelihood metric, in accordance with some embodiments. In the map 710, the enriched birth locations are represented by dots 712 which have different sizes and color scales to represent the values of the likelihood metric. An estimated geographical boundary is shown as the outline 714. A user may filter the enriched birth locations based on the values of the likelihood metric, using the control element 716 which has a sliding scale. A user may also control the radius (e.g., by miles) of the grouping of enriched birth locations, using the control element 718, which includes a sliding scale to adjust the grouping radius.

Figure 7B:
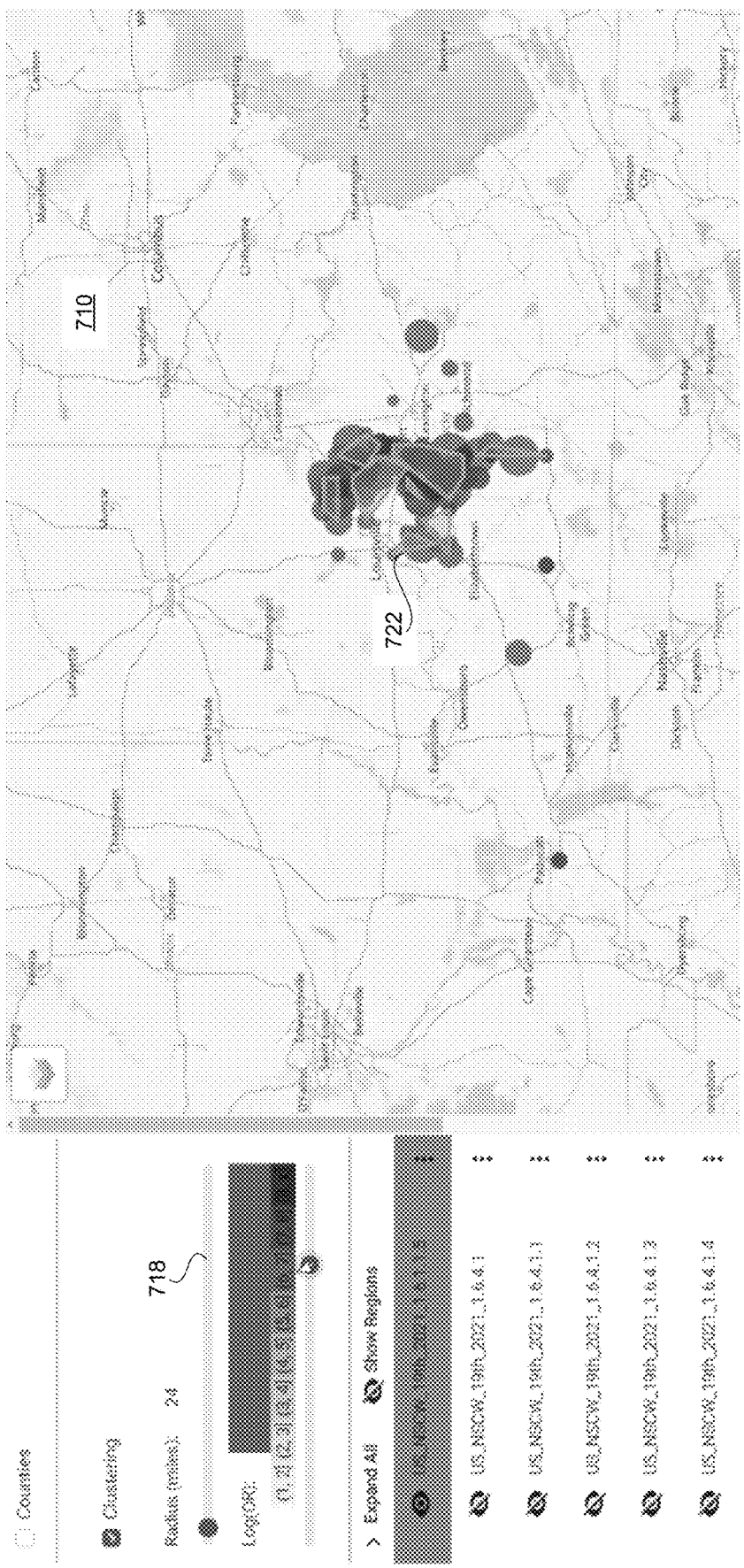
FIG. 7B is a conceptual diagram of a graphical user interface illustrating the change of grouping radius of enrich birth locations, in accordance with some embodiments.

FIG. 7B is a conceptual diagram of a graphical user interface illustrating the change of grouping radius of enriched birth locations, in accordance with some embodiments. A user may use the control element 718 to adjust the group radius of the enriched birth locations. Compared to FIG. 7A, FIG. 7B has the grouping radius reduced from 179 miles to 24 miles. In FIG. 7A, the enriched birth locations shown in the map 710 are assigned to a single group. As such, a single probability density distribution is generated and the estimated geographical boundary 714 only corresponds to a single group. In FIG. 7B, the grouping radius is significantly reduced. The enriched birth locations are now assigned to different groups. As such, multiple probability density distributions are generated and multiple unrelated estimated geographical boundaries 722 are also generated. The grouping radius selection in FIG. 7A may work well for the current zoom level of map 710. If the map 710 is further zoomed in, the grouping radius selection in FIG. 7B may work better. A user may adjust the grouping radius based on the zoom level of the map.

Figure 7C:
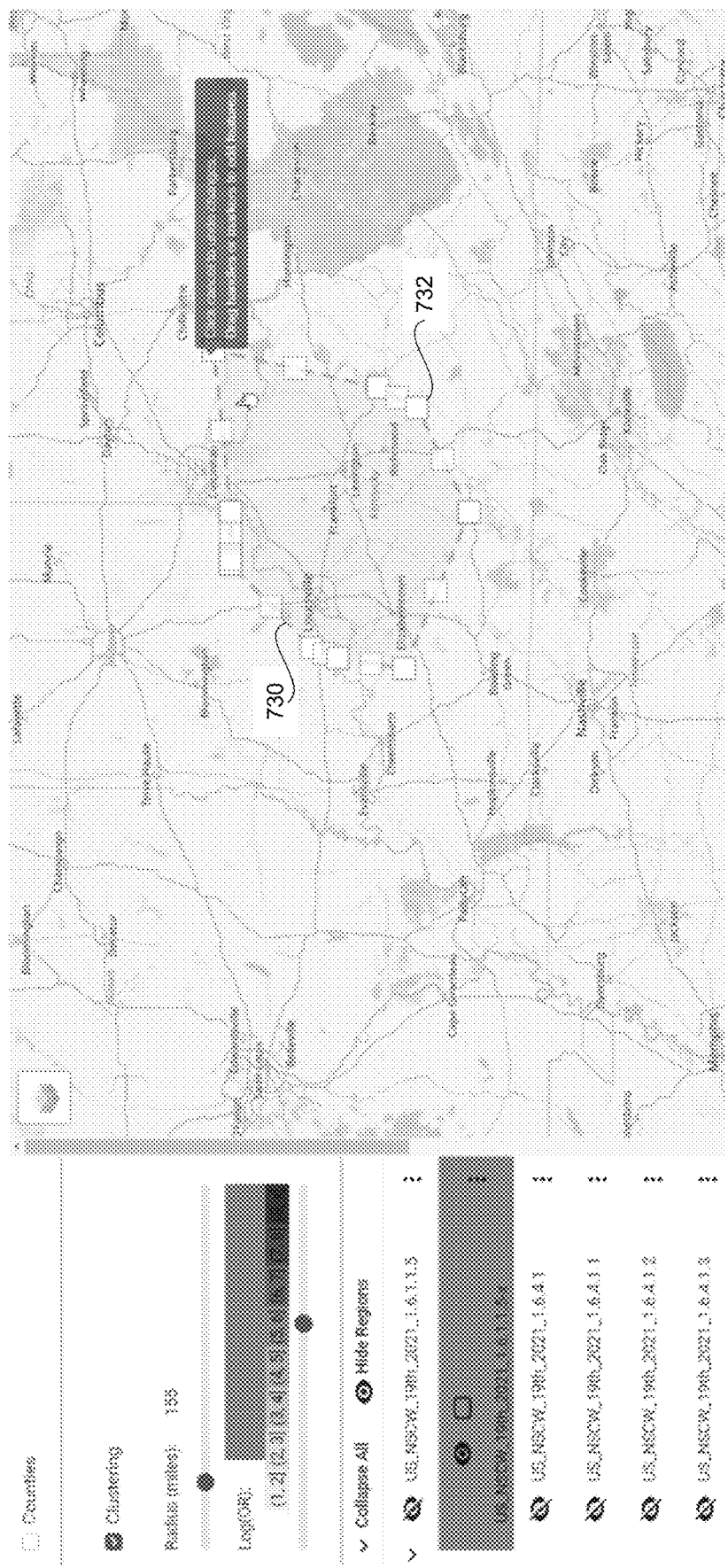
FIG. 7C is a conceptual diagram of a graphical user interface illustrating connection points of an estimated geographical boundary, in accordance with some embodiments.

FIG. 7C is a conceptual diagram of a graphical user interface illustrating connection points of an estimated geographical boundary, in accordance with some embodiments.

After receiving data of an estimated geographical boundary 730, a computing device may assign one or more connection points 732 to the estimated geographical boundary. The connection points 732 allow a user to manually adjust the boundary after the estimated geographical boundary 730 is automatically generated.

Figure 7D:
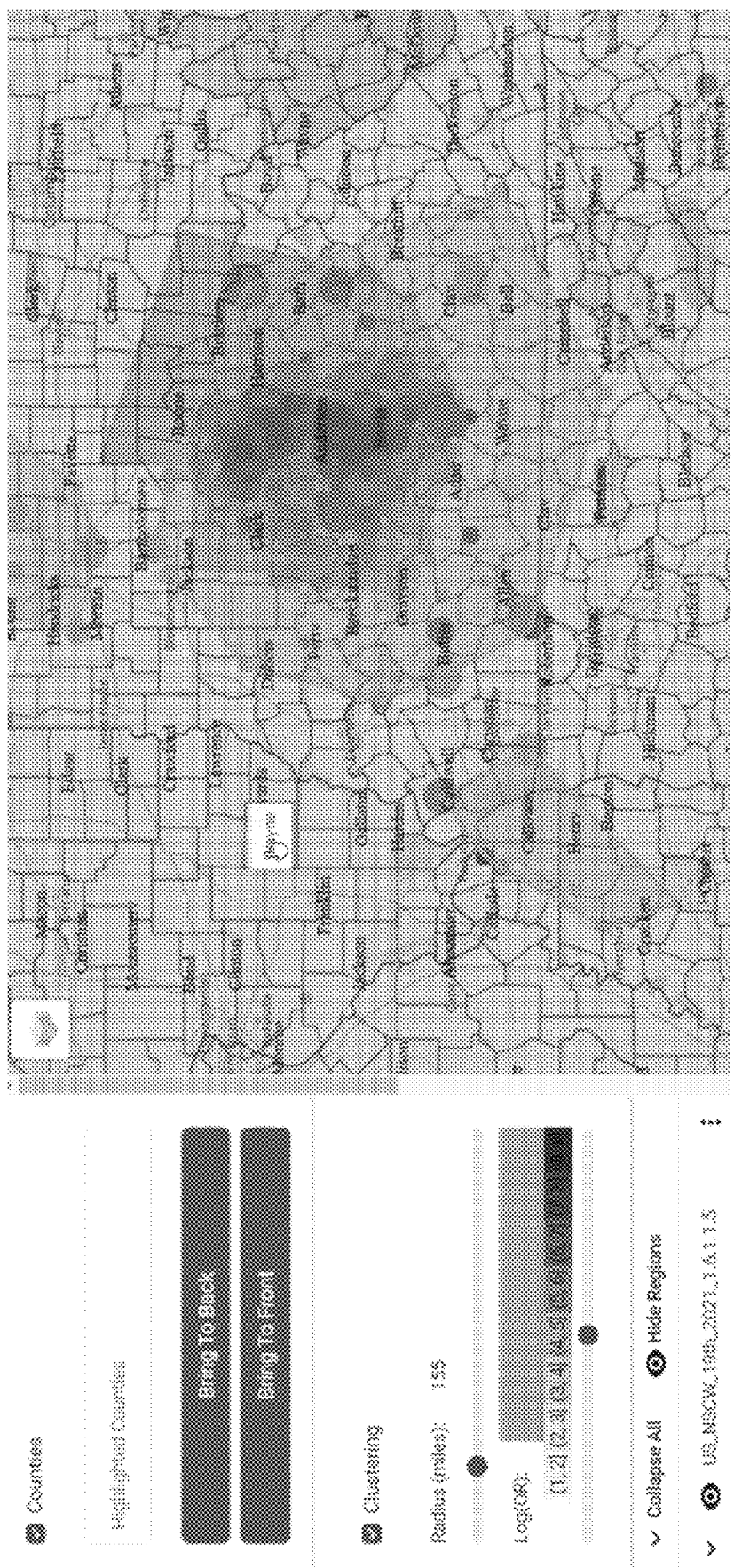
FIG. 7D is a conceptual diagram of a graphical user interface illustrating different layers of a map, in accordance with some embodiments.

FIG. 7D is a conceptual diagram of a graphical user interface illustrating different layers of a map, in accordance with some embodiments. A map may be associated with various map lines such as county lines, water lines, administration region lines, elevation lines, etc. In FIG. 7D, the example shows that the county lines are turned on and shown in the map. A user may align the estimated geographical boundary to the county lines. For example, the estimated geographical boundary may be snap to the county line. This may provide a better estimate of the estimated geographical boundary because a birth location is defined by coordinates that may be aligned with one or more map lines. For example, an enriched birth location of X county should mean that the estimated geographical boundary should include the entire county. Likewise, sometimes the estimated geographical boundary is automatically generated and includes unlikely locations such as the sea. The graphical user interface may also be an adjustment of the estimated geographical boundary to conform with one or more map lines. Features such as counties or other historical or regional details may be automatically used to provide a name for a community. For example, where a majority of enriched birth locations fall within the boundaries of two counties (e.g. Anderson and Bovie counties, as shown in FIG. 7D), those county names may be suggested as a compound name (e.g. "Anderson-Bovie") for the community. In other embodiments, features such as county boundaries may be used to automatically adjust the boundaries of the community for improved odds ratios or other likelihood metrics.

Computing Machine Architecture

Figure 8:
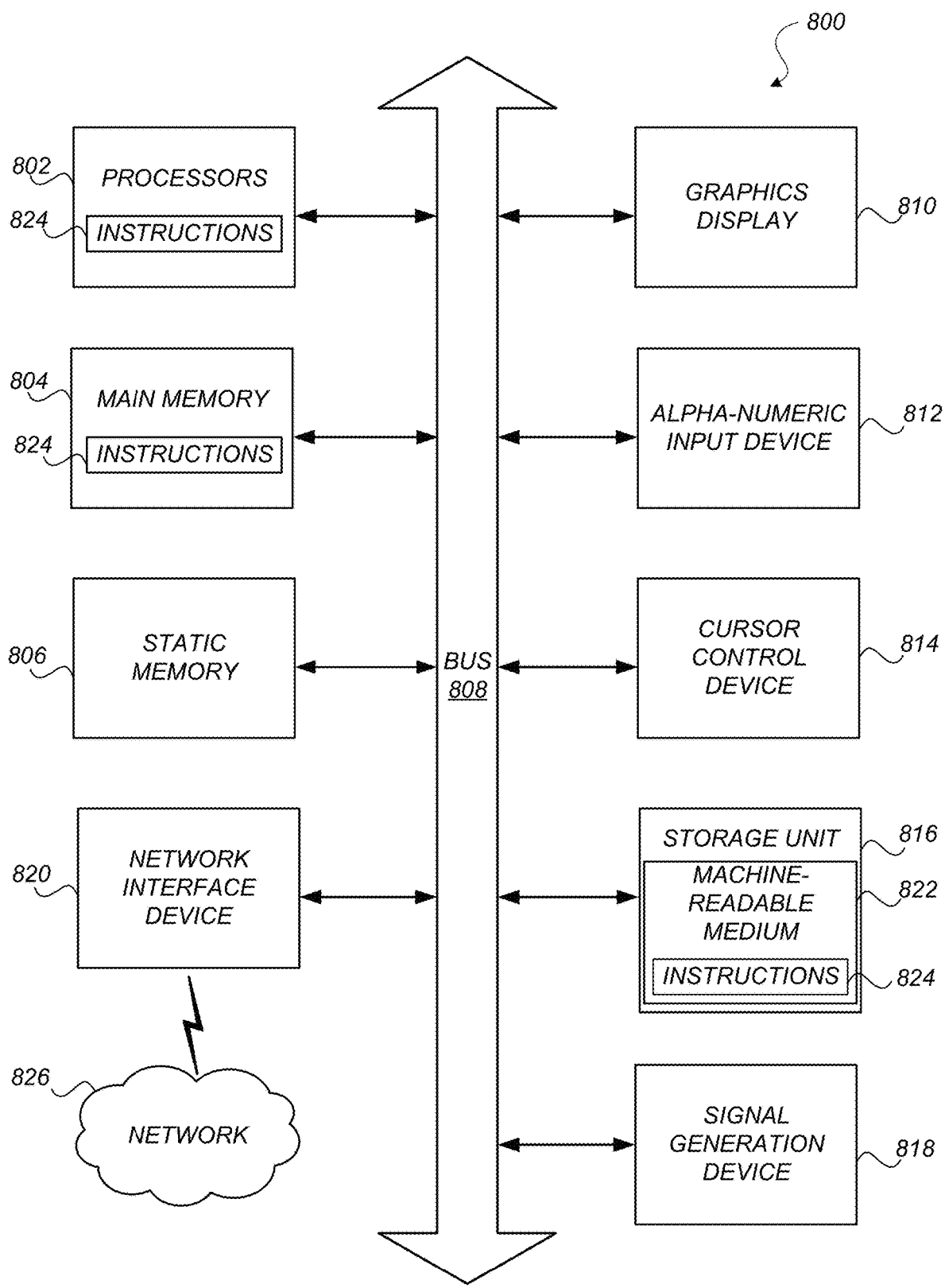
FIG. 8 is a block diagram of an example computing device, in accordance with some embodiments.

FIG. 8 is a block diagram illustrating components of an example computing machine that is capable of reading instructions from a computer-readable medium and execute them in a processor (or controller). A computer described herein may include a single computing machine shown in FIG. 8, a virtual machine, a distributed computing system that includes multiple nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1 and 2, including but not limited to, the client device 110, the computing server 130, and various engines, interfaces, terminals, and machines shown in FIG. 2. While FIG. 8 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the term "machine" and "computer" may also be taken to include any collection of machines that individually or jointly execute instructions 824 to perform any one or more of the methodologies discussed herein.

The example computer system 800 includes one or more processors 802 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 800 may also include a memory 804 that store computer code including instructions 824 that may cause the processors 802 to perform certain actions when the instructions are executed, directly or indirectly by the processors 802. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 802 and reduces the space required for the memory 804. For example, the data processing techniques, automatic geographical boundary determination and machine learning methods described herein reduce the complexity of the computation of the processors 802 by applying one or more novel techniques that simplify the steps in data processing, training, reaching convergence, and generating results of the processors 802. The algorithms described herein also reduces the size of the models and datasets to reduce the storage space requirement for memory 804.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors.

The computer system 800 may include a main memory 804, and a static memory 806, which are configured to communicate with each other via a bus 808. The computer system 800 may further include a graphics display unit 810 (e.g., a plasma display panel (PDP), a liquid crystal display (LCD), a projector, or a cathode ray tube (CRT)). The graphics display unit 810, controlled by the processors 802, displays a graphical user interface (GUI) to display one or more results and data generated by the processes described herein. The computer system 800 may also include alphanumeric input device 812 (e.g., a keyboard), a cursor control device 814 (e.g., a mouse, a trackball, a joystick, a motion sensor, or other pointing instruments), a storage unit 816 (a hard drive, a solid-state drive, a hybrid drive, a memory disk, etc.), a signal generation device 818 (e.g., a speaker), and a network interface device 820, which also are configured to communicate via the bus 808.

The storage unit 816 includes a computer-readable medium 822 on which is stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store instructions (e.g., instructions 824). The computer-readable medium may include any medium that is capable of storing instructions (e.g., instructions 824) for execution by the processors (e.g., processors 802) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558, 930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6) U.S. Pat. No. 11,429,615, entitled "Linking Individual Datasets to a Database," granted on Aug. 30, 2022, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

What is claimed is:

1. A computer-implemented method, comprising:
defining a community comprising a plurality of individuals;
receiving birth location data of at least a subset of individuals selected from the plurality of individuals in the community, the birth location data comprising geographic coordinates of a plurality of birth locations for the subset of individuals;
determining likelihood metrics for the plurality of birth locations, wherein a likelihood metric for a particular birth location corresponds to a likelihood that a member of the community is associated with the particular birth location;
identifying enriched birth locations for the community based on the likelihood metrics, the enriched birth locations being birth locations that are statistically significantly associated with the community;
determining an estimated geographic boundary of the community, the estimated geographic boundary corresponding to a probability density of the enriched birth locations represented using the geographical coordinates; and
causing a graphical user interface to present the estimated geographic boundary of the community, the estimated geographic boundary overlaying a map presented in the graphical user interface.

2. The computer-implemented method of claim 1, wherein determining the estimated geographic boundary for the community comprises:
generating a three-dimensional map comprising the geographic coordinates of the enriched birth locations plotted in x and y dimensional space and the likelihood metrics associated with the enriched birth locations plotted in a z-dimension;
determining a distribution of an overall probability density of the enriched birth locations; and
defining the estimated geographic boundary as a x,y-plane cross-section of the distribution at a selected z-value.

3. The computer-implemented method of claim 2, wherein determining the distribution of the overall probability density of the enriched birth locations comprises using kernel density estimation.

4. The computer-implemented method of claim 1, wherein identifying the enriched birth locations for the community comprises:
filtering the enriched birth locations based at least in part on a range of birth years or a geographical range of birth locations.

5. The computer-implemented method of claim 1, wherein the likelihood metrics for the particular birth location corresponds to an odds ratio of a match frequency to a background frequency, the match frequency is the frequency of members of the community having the particular birth location, and the background frequency is the frequency of individuals outside of the community having the particular birth location.

6. The computer-implemented method of claim 1, wherein the estimated geographical boundary is adjustable manually through the graphical user interface.

7. The computer-implemented method of claim 6, wherein at least part of the estimated geographical boundary is adjusted to a county line that defines one of the enriched birth locations.

8. The computer-implemented method of claim 1, further comprising receiving birth year data and the enriched birth locations are filtered by a range of birth years.

9. The computer-implemented method of claim 1, wherein identifying enriched birth locations comprises using a Fisher's Exact Test to determine whether a candidate enriched birth location is statistically significantly associated with the community.

10. The computer-implemented method of claim 1, wherein the community is a genetic community.

11. The computer-implemented method of claim 10, wherein determining the genetic community comprising:
representing a population of individuals in a graph and connecting the individuals of the population based on identity-by-descent (IBD) match DNA segments of the individuals;
grouping the individuals represented in the graph into one or more clusters; and
defining one of the clusters as the genetic community.

12. A system comprising:
a computing server comprising memory and one or more processors, the memory configured to store code comprising instructions, wherein the instructions, when executed by the one or more processors, cause the one or more processors to perform steps comprising:
defining a community comprising a plurality of individuals;
receiving birth location data of at least a subset of individuals selected from the plurality of individuals in the community, the birth location data comprising geographic coordinates of a plurality of birth locations for the subset of individuals;
determining likelihood metrics for the plurality of birth locations, wherein a likelihood metric for a particular birth location corresponds to a likelihood that a member of the community is associated with the particular birth location;
identifying enriched birth locations for the community based on the likelihood metrics, the enriched birth locations being birth locations that are statistically significantly associated with the community; and
determining an estimated geographic boundary of the community, the estimated geographic boundary corresponding to a probability density of the enriched birth locations represented using the geographical coordinates; and
a graphical user interface in communication with the computing server, the graphical user interface configured to present a map and the estimated geographic boundary of the community, the estimated geographic boundary overlaying the map.

13. The system of claim 12, wherein determining the estimated geographic boundary for the community comprises:
generating a three-dimensional map comprising the geographic coordinates of the enriched birth locations plotted in x and y dimensional space and the likelihood metrics associated with the enriched birth locations plotted in a z-dimension;

determining a distribution of an overall probability density of the enriched birth locations; and defining the estimated geographic boundary as a x,y-plane cross-section of the distribution at a selected z-value.

14. The system of claim 13, wherein determining the distribution of the overall probability density of the enriched birth locations comprises using kernel density estimation.

15. The system of claim 12, wherein identifying the enriched birth locations for the community comprises:

filtering the enriched birth locations based at least in part on a range of birth years or a geographical range of birth locations.

16. The system of claim 12, wherein the likelihood metrics for the particular birth location corresponds to an odds ratio of a match frequency to a background frequency, the match frequency is the frequency of members of the community having the particular birth location, and the background frequency is the frequency of individuals outside of the community having the particular birth location.

17. The system of claim 12, wherein the estimated geographical boundary is adjustable manually through the graphical user interface.

18. The system of claim 12, wherein the community is a genetic community and wherein determining the genetic community comprising:

representing a population of individuals in a graph and connecting the individuals of the population based on identity-by-descent (IBD) match DNA segments of the individuals;

grouping the individuals represented in the graph into one or more clusters; and defining one of the clusters as the genetic community.

19. A non-transitory computer-readable medium configured to store code comprising instructions, wherein the instructions, when executed by one or more processors, cause the one or more processors to perform steps comprising:

defining a community comprising a plurality of individuals;

receiving birth location data of at least a subset of individuals selected from the plurality of individuals in the community, the birth location data comprising geographic coordinates of a plurality of birth locations for the subset of individuals;

determining likelihood metrics for the plurality of birth locations, wherein a likelihood metric for a particular birth location corresponds to a likelihood that a member of the community is associated with the particular birth location;

identifying enriched birth locations for the community based on the likelihood metrics, the enriched birth locations being birth locations that are statistically significantly associated with the community;

determining an estimated geographic boundary of the community, the estimated geographic boundary corresponding to a probability density of the enriched birth locations represented using the geographical coordinates; and causing a graphical user interface to present the estimated geographic boundary of the community, the estimated geographic boundary overlaying a map presented in the graphical user interface.

20. The non-transitory computer-readable medium of claim 19, wherein determining the estimated geographic boundary for the community comprises:

generating a three-dimensional map comprising the geographic coordinates of the enriched birth locations plotted in x and y dimensional space and the likelihood metrics associated with the enriched birth locations plotted in a z-dimension;

determining a distribution of an overall probability density of the enriched birth locations; and defining the estimated geographic boundary as a x,y-plane cross-section of the distribution at a selected z-value.

* * * * *